(12) United States Patent
Lewis et al.

(10) Patent No.: US 10,066,528 B2
(45) Date of Patent: Sep. 4, 2018

(54) DNOX DOSING TESTER AND METHOD

(71) Applicant: Robert Bosch GmbH, Stuttgart (DE)

(72) Inventors: David B. Lewis, Warren, MI (US); David R. Nowak, Jr., Monroe, MI (US)

(73) Assignee: Robert Bosch GmbH, Stuttgart (DE)

( * ) Notice: Subject to any disclaimer, the term of this patent is extended or adjusted under 35 U.S.C. 154(b) by 97 days.

(21) Appl. No.: 15/178,674

(22) Filed: Jun. 10, 2016

(65) Prior Publication Data

US 2017/0356318 A1 Dec. 14, 2017

(51) Int. Cl.
| | |
|---|---|
| *G01M 15/02* | (2006.01) |
| *F01N 3/20* | (2006.01) |
| *G01F 23/14* | (2006.01) |
| *F01N 9/00* | (2006.01) |

(52) U.S. Cl.
CPC .......... *F01N 3/208* (2013.01); *F01N 3/206* (2013.01); *F01N 9/00* (2013.01); *G01F 23/14* (2013.01); *F01N 2550/05* (2013.01); *F01N 2570/14* (2013.01); *F01N 2610/02* (2013.01); *F01N 2610/146* (2013.01); *F01N 2610/1406* (2013.01); *F01N 2610/1453* (2013.01); *F01N 2900/1821* (2013.01)

(58) Field of Classification Search
USPC ...................................................... 73/114.69
See application file for complete search history.

(56) References Cited

U.S. PATENT DOCUMENTS

| | | | |
|---|---|---|---|
| 8,899,021 B2 | 12/2014 | Dingle et al. | |
| 8,920,757 B1 | 12/2014 | Chandrapati et al. | |
| 2010/0229531 A1* | 9/2010 | Chi | B01D 53/90 60/274 |
| 2013/0186470 A1* | 7/2013 | Offenhuber | F01N 3/208 137/1 |
| 2014/0245719 A1 | 9/2014 | Mitchell et al. | |
| 2014/0260216 A1* | 9/2014 | Everard | F01N 3/208 60/301 |
| 2014/0325961 A1 | 11/2014 | Yokota et al. | |
| 2014/0331645 A1 | 11/2014 | Cole et al. | |
| 2015/0034189 A1* | 2/2015 | Burger | F01N 3/2066 137/565.01 |
| 2015/0047327 A1 | 2/2015 | Overhoff et al. | |
| 2015/0226103 A1* | 8/2015 | Greiner | F01N 3/2066 60/274 |
| 2018/0010502 A1* | 1/2018 | Farr | F01N 3/10 |

* cited by examiner

*Primary Examiner* — Eric S McCall
(74) *Attorney, Agent, or Firm* — Michael Best & Friedrich LLP

(57) ABSTRACT

An arrangement for testing or treating a dosing valve of a dosing device of a dosing system in a vehicle includes connecting an electrical test drive to an electrical connector of the dosing device and connecting a dosing tester to a liquid inlet of the dosing device. Thereafter, an outlet valve of the dosing tester is opened to provide liquid under pressure to a liquid inlet of the dosing device. After a first given time, the electrical test drive provides pulses to repeatedly attempt to open the dosing valve. Upon a reduction in liquid level of liquid within the dosing tester in response to opening of the dosing valve, an operator closes the outlet valve of the dosing tester to discontinue the treatment.

15 Claims, 7 Drawing Sheets

DNOX DOSING TESTER AND METHOD

BACKGROUND

Embodiments of the invention relate to a method and apparatus for treating a malfunctioning dosing valve of a dosing device.

A dosing system is known to reduce mono-nitrogen oxides NO and $NO_2$ (nitric oxide and nitrogen dioxide) output from an exhaust pipe connected to an internal combustion engine of a vehicle. A DNOx sensor senses a concentration of nitrogen oxides NOx in an exhaust pipe and a dosing valve sprays urea solution, such as diesel emission fluid (DEF), into the exhaust pipe connected to the internal combustion engine of a diesel vehicle. This technique, as part of a selective catalytic reduction system (SCR), significantly reduces residual nitrogen oxides output in the exhaust of the vehicle.

FIG. 1 shows a known dosing system 20 for an internal combustion engine that includes an electronic dosing device controller 24 that provides electrical power over an electrical connector 26 to a dosing device 30. The electrical power controls a dosing valve 34 of the dosing device 30. FIG. 1 also shows a urea solution storage device 38 and a fluid connecting line 40 joined by a fluid connector 44 to a first end 46 of the dosing device 30. A second end 48 of the dosing device is in communication with an exhaust pipe 50.

The dosing device 30 includes a dosing valve 34 having a dosing valve needle that is controlled to spray urea solution into the exhaust pipe of a diesel vehicle. In some instances, crystals are formed in the dosing device 30 due to an insufficient purge of the urea solution about the dosing valve needle or due to lack of use or actuation of the dosing valve needle for a long period of time. In instances wherein the dosing valve 34 is inoperative, the dosing device 30 is entirely removed from the vehicle and replaced.

FIG. 2 shows a dosing valve 34 that includes a connector member 54 and an electrical terminal 56 for joining to the electrical connector 26. The dosing device 30 includes various elements of a dosing valve, including an extension tube 58, a basket filter 60 and an adjustment sleeve 62. Further, the dosing valve 34 includes a spring 66 and a support tube 68 disposed within the extension tube 58. Further, the dosing valve 34 includes a needle sleeve 70 for surrounding the dosing valve needle. The dosing valve 34 includes a valve ball 74, a valve seat 76 and an orifice plate 80.

The dosing valve 34 shown in FIG. 2 includes a magnetic coil or bobbin 84 that receives electrical power and acts as an actuator to move the dosing valve needle that acts as a dosing valve. Further, FIG. 2 shows a housing 86, a grommet 88, an armature 90 and a cover 92 of the dosing valve 34. The dosing valve needle moves axially in operation to spray urea solution into the interior of an exhaust pipe.

One object of the invention is to treat a dosing device so that the dosing valve operates properly without requiring removal and replacement of the dosing device from a vehicle.

SUMMARY

In one embodiment, the invention provides a dosing tester for treating a dosing device of a vehicle. The dosing tester includes a storage tube that includes a liquid fill level mark, and at least a portion of the storage tube being transparent to view liquid level with respect to the liquid fill level mark, an outlet including an outlet valve disposed at a first end of the storage tube and an inlet including an inlet valve disposed at a second end of the storage tube for receiving liquid. The dosing tester also includes an air valve for receiving air pressure into the storage tube, and the dosing tester is configured to provide liquid under pressure to a dosing device of a vehicle.

In another embodiment, the invention provides a method for testing or treating a dosing valve of a dosing device of a dosing system in a vehicle. The method includes connecting an electrical test drive to an electrical connector of the dosing device; connecting a dosing tester to a liquid inlet of the dosing device; opening an outlet valve of the dosing tester to provide liquid to the liquid inlet of the dosing device; after a first given time, operating the electrical test drive to attempt to open the dosing valve; and upon a reduction in liquid level of liquid within the dosing tester in response to opening of the dosing valve, closing the outlet valve of the dosing tester to discontinue the treatment and/or releasing pressure within a storage tube of the dosing device to discontinue the treatment In another embodiment, the invention provides a method for testing or treating a dosing valve of a dosing device of a dosing system provided for reducing mono-nitrogen oxides NOx output by an exhaust pipe of a vehicle. The method includes disconnecting an electronic dosing device controller from the dosing device; disconnecting a urea storage device from the dosing device; connecting an electrical test drive to an electrical connector of the dosing device; and connecting a dosing tester to a liquid inlet of the dosing device. The method further includes opening an outlet valve of the dosing tester to provide liquid to the liquid inlet of the dosing device; after a first given time, operating the electrical test drive to attempt to open the dosing valve; and when a reduction in liquid level of liquid within the dosing tester occurs in response to opening of the dosing valve, closing the outlet valve of the dosing tester and discontinuing operation of the electrical test drive.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 3:
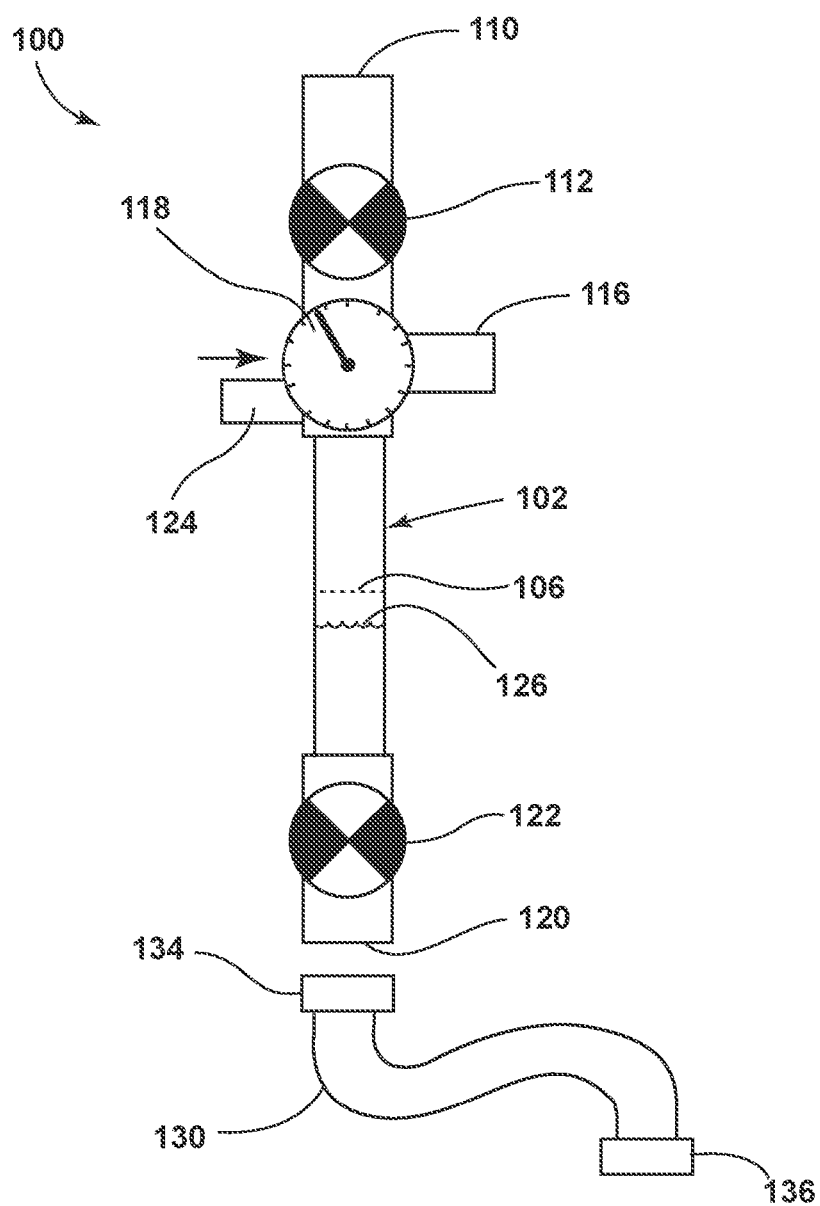
FIG. 3 illustrates one embodiment of a dosing tester.

FIG. 3 shows one embodiment of a dosing tester 100 for determining proper operation of the dosing device 30. The dosing tester 100 includes an at least partially transparent storage tube 102 having at least an essentially transparent portion near a liquid fill level mark 106 that is visible. The dosing tester 100 has an inlet 110 at a top end for receiving liquid and an adjacent inlet valve 112. In one embodiment, the dosing tester 100 includes a Schrader valve 116 for enabling air pressure into the dosing tester 100 and a pressure gauge 118 for displaying pressure within the storage tube 102. Further, the dosing tester 100 includes a pressure relief valve 124 for an instance wherein the pressure within the storage tube 102 is too great. The dosing tester 100 includes an outlet 120 at a bottom end and an adjacent outlet valve 122. Actual liquid level of water disposed within the dosing tester 100, in one embodiment, is shown by numeral 126 in FIG. 3.

The dosing tester 100 shown in FIG. 3 includes a liquid adapter 130 having a first liquid connector 134 for connection to the outlet 120 of the dosing tester 100. The liquid adapter 130 includes a second liquid connector 136 for connection to the first end 46 of the dosing device 30 to provide fluid to the dosing valve 34. Thus, the liquid adapter 130 provides fluid communication between the dosing tester 100 and the dosing device 30.

Figure 4:
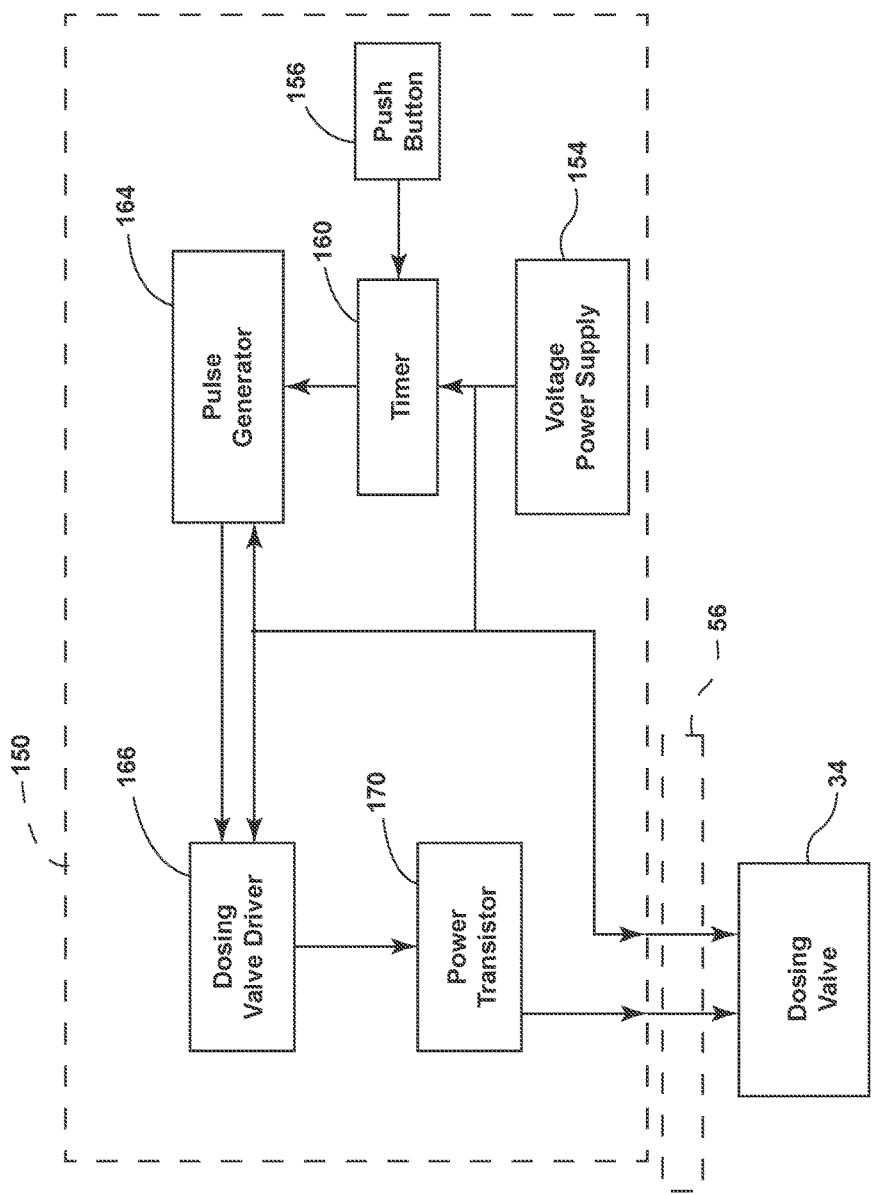
FIG. 4 illustrates a block diagram of one embodiment of a dosing electrical test drive.

FIG. 4 illustrates a block diagram of one embodiment of an electrical test drive 150 that connects to the dosing device 30 via electrical terminal 56 to power the dosing valve 34. The electrical test drive 150 includes a voltage power supply 154 that provides power to all of the components. In one embodiment, the voltage power supply 154 includes a pair of nine volt batteries connected in series and a voltage regulator to provide a voltage output of 12 volts to various components.

The electrical test drive 150 shown in FIG. 4 includes an actuator, such as push button or momentary contact switch 156 that is actuated by an operator to trigger an electrical output. The electrical output or ON signal is provided to a timer 160. The timer 160 provides an output to a pulse generator 164. In one embodiment, the timer includes a 555 chip. The pulse generator 164 provides pulses to a dosing valve driver 166. In one embodiment, the dosing valve driver 166 reduces the current flow for pulses and provides an output to a power transistor 170. The power transistor 170 provides an output via the electrical terminal 56 of the dosing device 30 to control the dosing valve 34. The output of the voltage power supply 154 is provided separately to the terminal of the dosing valve 34. In one embodiment, the power transistor 170 switches between an open circuit when the dosing valve 34 does not operate and a closed circuit wherein power is applied thereto. In one embodiment, the power transistor 170 via the pulse generator 164 has a pulse time of about 10 milliseconds for a time period of about 20 milliseconds. Thus, operation occurs in such a manner. In one embodiment, the electrical test drive 150 operates for about 110 seconds. Thus, from a momentary touch of the push button 156, the electrical test drive 150 operates to repeatedly provide a pulse about every 20 milliseconds for a length of time of about 110 seconds for each instance that the electrical test drive 150 is actuated. In other embodiments, other pulse lengths, pulse time periods and lengths of time of operation are contemplated. In conclusion, the electrical test drive 150, which is physically separate from the dosing tester 100, is configured for electrically controlling the dosing valve 34 of the dosing device 30.

Figure 5:
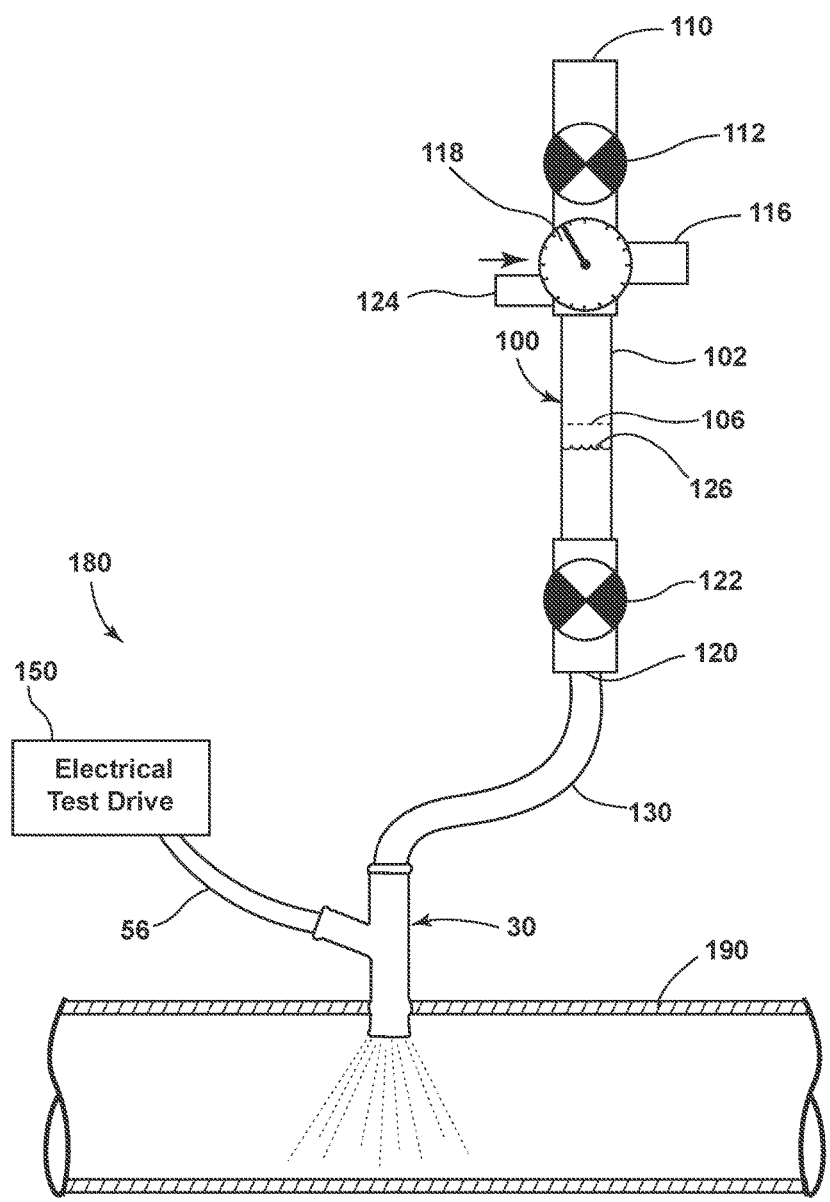
FIG. 5 illustrates a dosing testing arrangement for a dosing device installed on a vehicle.

FIG. 5 shows a dosing testing arrangement 180 that includes the dosing tester 100 and the electrical test drive 150 disposed in communication with a dosing device 30 that is secured to an exhaust pipe 190. The dosing testing arrangement 180 can be used as a service kit. In one embodiment, the service kit includes a dosing tester 100, a liquid adapter 130, and an electrical test drive 150. In another embodiment, the pressure gauge 118 is a separate independent element from the dosing tester 100, and a separate part of the service kit. In yet another embodiment, the dosing tester 100 does not include the pressure gauge and/or the pressure relief valve 124.

Preparation of Dosing Tester

Figure 6:
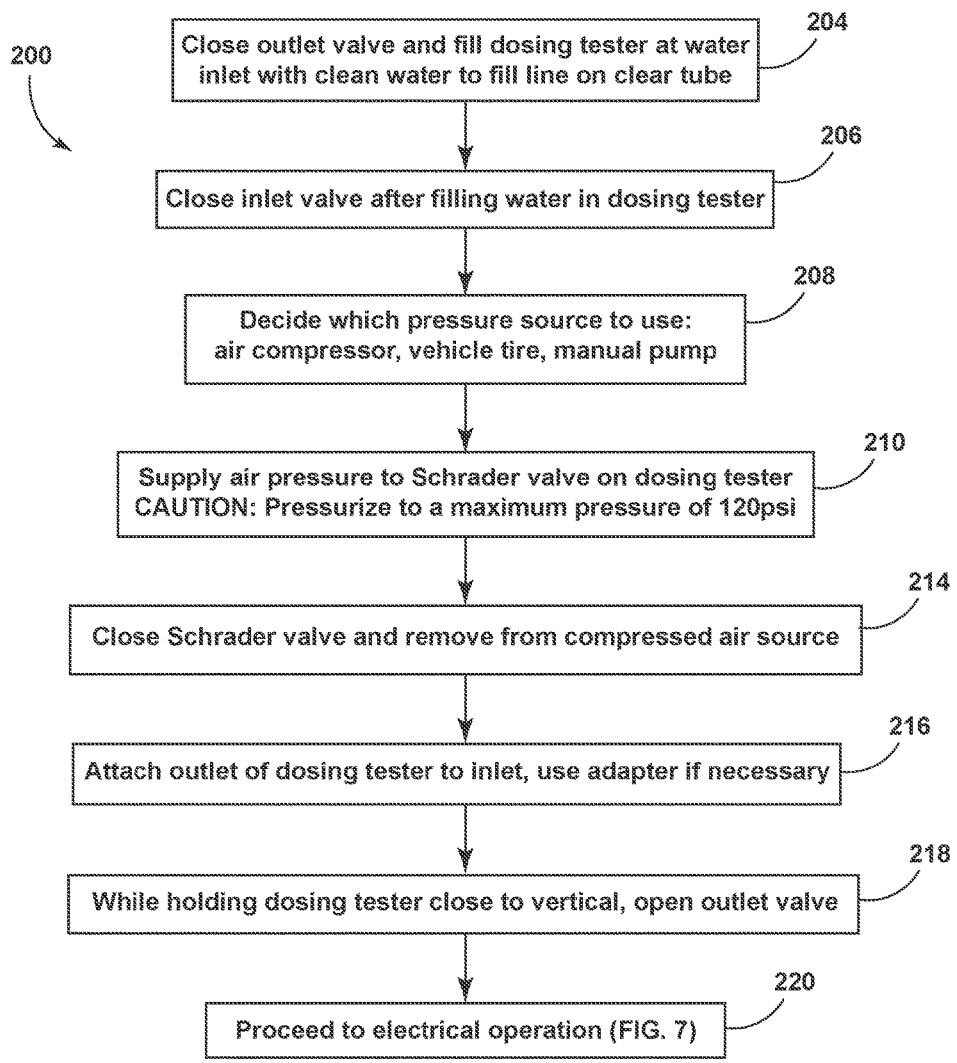
FIG. 6 is a flow chart illustrating preparation and usage of the dosing tester.

The dosing tester 100 is prepared for use as set forth in the flow chart 200 of FIG. 6. First, the outlet valve 122 is closed (step 204) while the inlet valve 112 is opened. Upon filling the storage tube 102 with liquid, such as water, to the liquid fill level mark 106, filling is discontinued and the inlet valve 112 is closed (step 206).

Thereafter, a user selects a pressure source (step 208 shown in FIG. 6). The pressure source is an air compressor, a vehicle tire, a manual pump, or other device that includes pressured air. Air pressure is supplied to a Schrader valve 116 to pressurize the liquid and air (step 210) above the liquid within the storage tube 102 of the dosing tester 100. In one embodiment, a maximum pressure of 120 pounds per square inch (PSI) is provided. A pressure gauge 118 supplied in the service kit shows the pressure to an operator. In some embodiments, a pressure relief valve 124 is provided for limiting a significant overpressure from overfilling of the storage tube 102. The pressure relief valve 124 limits pressure by opening in response to a selected pressure level. Thereafter, the Schrader valve 116 is closed and the compressed air source is removed (step 214). Thus, the compressed air received by the Schrader valve 116 is discontinued. Therefore, the dosing tester 100 is prepared for usage.

Before the dosing tester 100 is attached to the dosing device, the urea storage device 38 must be detached. To detach the urea storage device 38, an operator must ensure that pressure in the fluid connecting line 40 is low. The operator must cover the connection between 40, 44 with a rag or cloth, and should wear safety glasses as urea solution is likely to be released. The urea storage device 38 and the fluid connecting line 40 shown in FIG. 1, have been detached from the fluid connector 44 and a first end 46 of the dosing device 30. Thus, the outlet 120 of the dosing tester 100 is connected by the liquid adapter 130 for liquid communication with the first end 46 of the dosing device 30 (step 216).

Operation

Next, an operator opens the outlet valve 122 to provide the pressured liquid into the extension tube 58 of the dosing device 30 (step 218). The dosing tester 100 is positioned and maintained in a vertically oriented position above the dosing device 30 during usage thereof. Thus, liquid, such as water, is provided under pressure to the dosing device 30.

Figure 7:
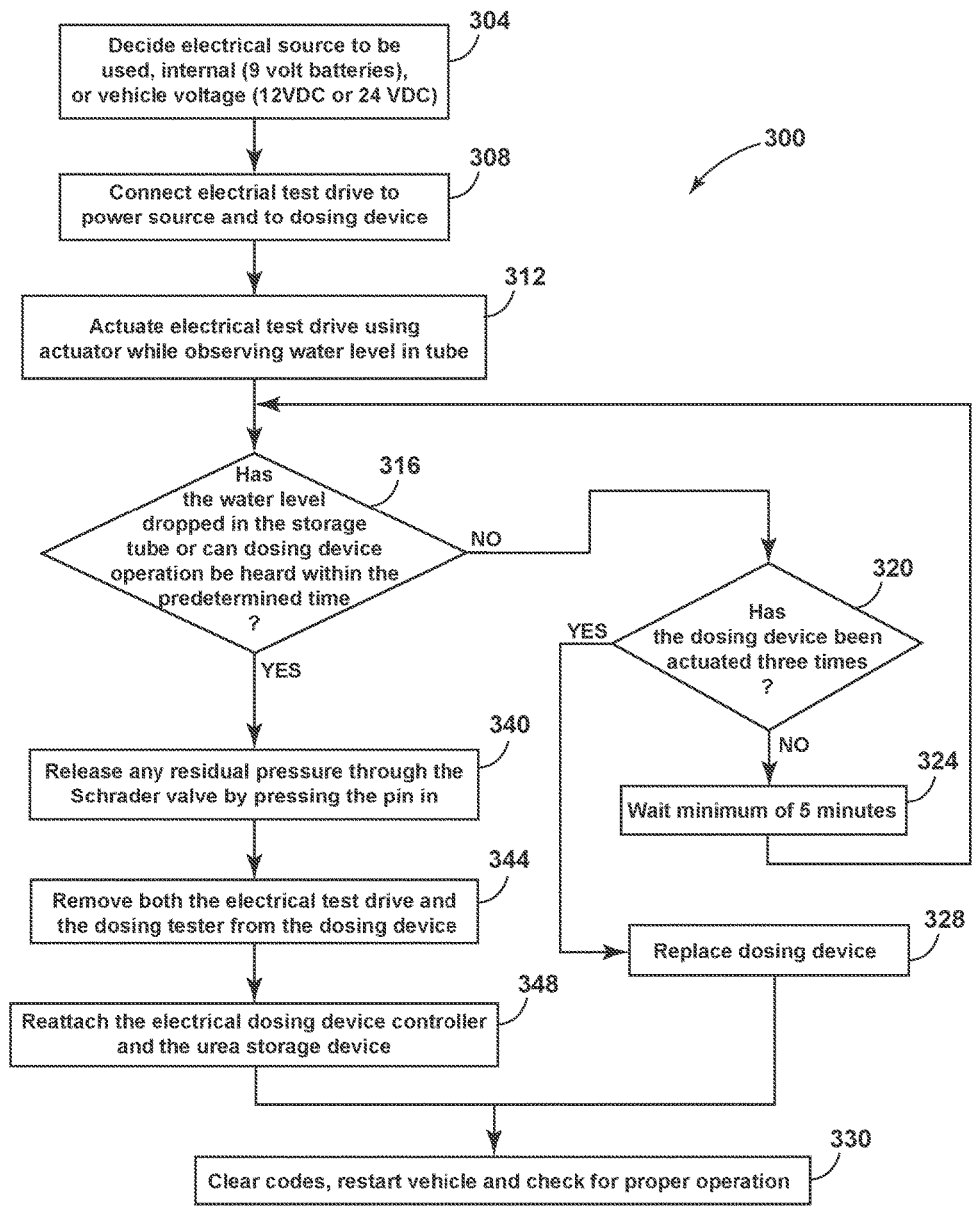
FIG. 7 is a flow chart illustrating usage of the dosing electrical test drive.

The process is the advanced from FIG. 6 (step 220), to the electrical operation shown in the flow chart 300 of FIG. 7.

In the flow chart 300 of FIG. 7, a decision for a power source or power supply 154 for the electrical test drive 150 is between vehicle voltage (twelve volts direct current (DC) or 24 volts DC) and internal batteries providing a power supply 154. One of the power supplies is selected by an operator (step 304). In one embodiment, the internal batteries are a pair of nine volt batteries. Thereafter, the electrical test drive 150 is connected to the power source and to the dosing device 30 (step 308). In some embodiments, these connections are completed earlier, even before the steps shown in the flow chart 200 of FIG. 6. The order of steps disclosed herein is not critical in most instances.

In typical usage, a given time is provided between the providing of pressurized liquid to the dosing device 30, and the operating of the electrical test drive 150 to attempt to open the dosing valve 34. In one embodiment, about five minutes is the preferred amount of time. Thereafter, an operator utilizes an actuator, such as the push button 156, to apply energy from the electrical test drive 150 to the dosing device 30 to attempt to open the dosing valve 34, while observing a liquid level 126 of, for example water, in the transparent storage tube 102 (step 312) of the dosing tester 100. The viewed liquid level 126 is compared with respect to the liquid fill level mark 106 of the dosing tester 100. As discussed above, before providing power to open the dosing valve 34, the dosing valve is considered plugged or clogged with crystals or otherwise inoperative for unknown reasons. Thus, the electrical test drive 150 is operated or provides power periodically to attempt to generate axial movement of the dosing valve needle.

Thereafter, an operator observes whether the liquid level 126 in the dosing tester 100 has decreased a significant amount. This observation may continue for almost two minutes, while the electric test drive 150 is periodically supplying pulses to drive the dosing valve 34 of the dosing device 30 in response to one touch of the actuator (step 316). In one embodiment, the amount of time is about 110 seconds.

When the liquid level 126 visible in the storage tube 102 has not decreased significantly within a specific time period indicating a blocked condition remains, an operator determines whether the electrical test drive 150 has been actuated three times (step 320). When the electrical test drive 150 has not been actuated three times, the operator waits a second given time and eventually a third given time, such as a minimum time period of about five minutes (step 324). In one embodiment, each of the first given time, the second given time, and the third given time are about five minutes. Thus, after waiting to operate the electrical test drive 150 for the second or third given time, the operator returns (step 312) and again actuates the electrical test drive 150 to power an actuator of the dosing valve 34 of the dosing device 30.

In the instance that the dosing device 30 has been actuated three times by the electrical test drive 150 for each of first, second, and third predetermined times (decision step 320), the operator determines that the dosing device 30 must be replaced with a second dosing device upon expiring of the third predetermined time without a decrease in liquid level of liquid within the dosing tester 100 (step 328).

Thus, the operator disconnects the electrical test drive 150 from the dosing device 30 and disconnects the dosing tester 100 (via disconnecting the liquid adapter 130 in some instances) from the liquid inlet of the dosing device 30 (step 328). The operator relieves pressure in the dosing tester 100 by pressing a pin of the Schrader valve 116. For protection, the operator typically covers the dosing device 30 with a rag or other element. Thereafter, the operator removes the dosing device 30 from the vehicle and secures a second dosing device to the vehicle in communication with an exhaust pipe 190 for providing liquid therein (step 328). Then, the operator connects an electronic dosing device controller 24 to the second dosing device and connects a urea storage device 38 to the second dosing device (step 328).

Thereafter, vehicle operating codes are cleared and the vehicle is restarted (step 330).

In the instance that a decrease in water level is visually determined by an operator (step 316), the operator realizes that the dosing valve 34 is opened, and thus operating properly. Thereafter, the operator releases any residual pressure within the dosing tester 100 by pressing a pin of the Schrader valve 116 (step 340). Further, the operator closes the outlet valve 122 of the dosing tester 30 to prevent water from being provided, as the treatment of the dosing valve 34 is completed. Thus, the operator may release residual pressure and/or close the outlet valve 122. Thereafter, the operator removes the dosing tester 100 (via disconnecting the liquid adapter 130) and the electrical test drive from the dosing device 30 (step 344).

Figure 1:
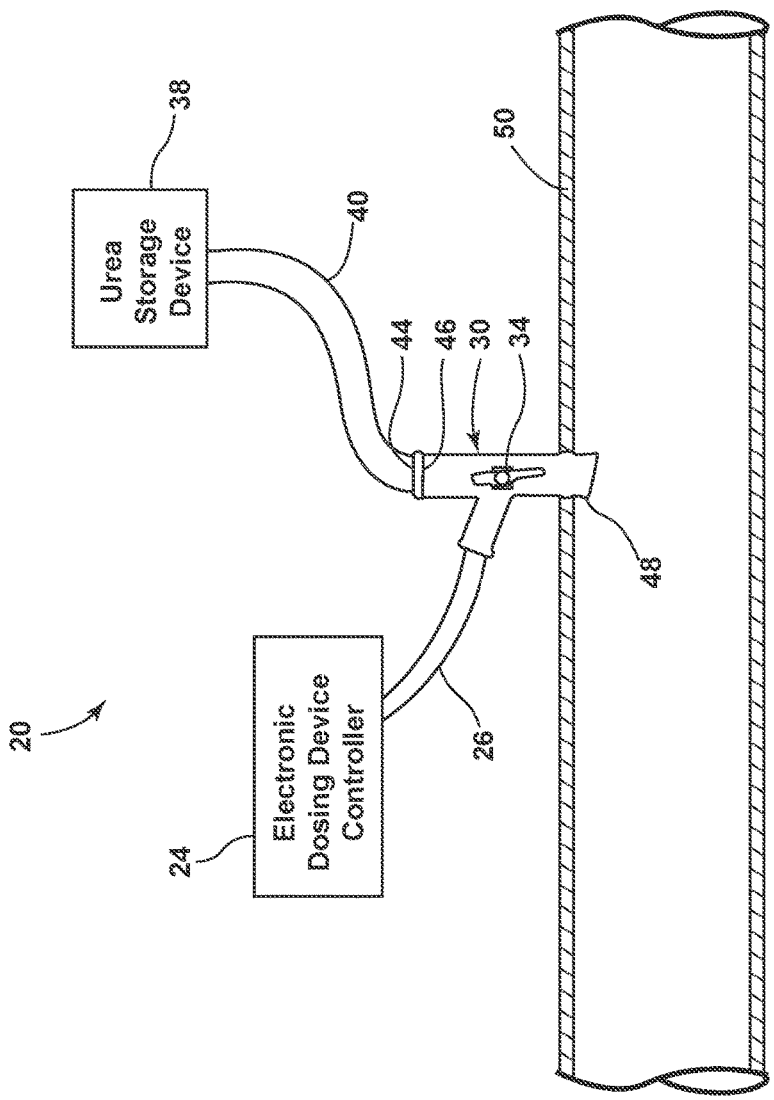
FIG. 1 illustrates a prior art dosing system for providing diesel emission fluid to an exhaust pipe.
Figure 2:
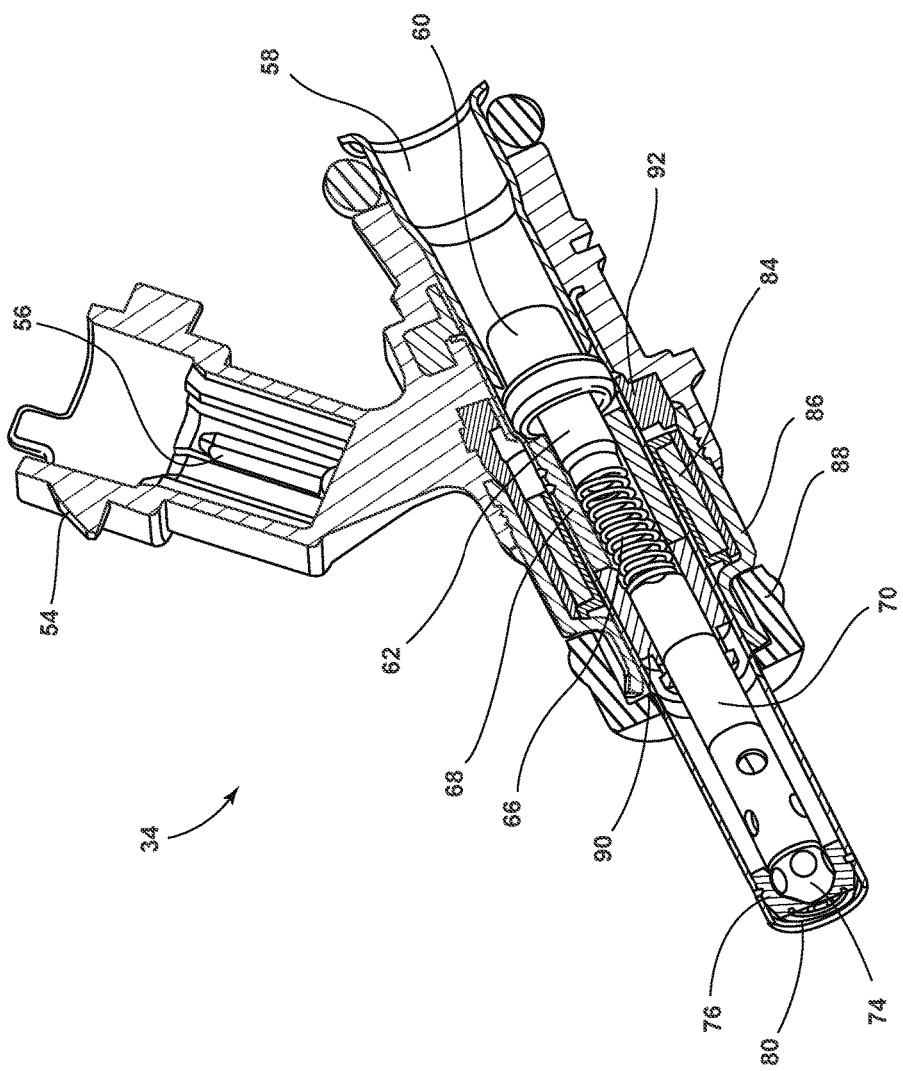
FIG. 2 illustrates a partial cross-sectional view of a prior art dosing valve.

Subsequently, the operator reattaches or reconnects the electronic dosing device controller 24 and reattaches or reconnects the urea solution storage device 38 (step 348) to obtain the dosing system 20 shown in FIG. 1. Then, the operator clears operating codes, restarts the vehicle and checks for proper operation thereof (step 330).

The combination of the dosing tester 100, the liquid adapter 130, and the electrical test drive 150, results in a system for at least temporarily permitting driving of a vehicle, such as a diesel vehicle, by increasing the ability to treat nitrogen oxides in the exhaust system.

While a Schrader valve 116 is disclosed for providing air into the dosing device 30 in one embodiment, other air valves are contemplated.

While driving the electrical test drive 150 three separate times in an attempt open the dosing valve 34 is disclosed, in some embodiments the electrical test drive 150 is operated two or more separate times are attempted, before a user stops attempting to open the dosing valve.

Thus, the invention provides, among other things, an arrangement for testing or treating a dosing valve of a dosing device that provides urea solution to an exhaust pipe of a vehicle so that replacement of the dosing device is avoided. Various features and advantages of the invention are set forth in the following claims.

What is claimed is:

1. A method for testing a dosing valve of a dosing device of a dosing system in a vehicle, the method comprising:
    connecting an electrical test drive to an electrical connector of the dosing device;
    connecting a dosing tester to a liquid inlet of the dosing device;
    opening an outlet valve of the dosing tester to provide liquid to the liquid inlet of the dosing device;
    after a first given time, operating the electrical test drive to attempt to open the dosing valve of the dosing device; and
    upon a reduction in liquid level of liquid within the dosing tester in response to opening of the dosing valve of the dosing device, closing the outlet valve of the dosing tester and/or releasing pressure within a storage tube of the dosing device.

2. The method according to claim 1, including, after operating the electrical test drive to attempt to open the dosing valve with no reduction in liquid level for a first predetermined time, discontinuing operation of the electrical test drive for a second given time;
    after the second given time, operating the electrical test drive to attempt to open the dosing valve of the dosing device; and
    upon a reduction in liquid level of liquid within the dosing tester in response to opening of the dosing valve of the dosing device, closing the outlet valve of the dosing tester and/or releasing pressure within a storage tube of the dosing device.

3. The method according to claim 1, including, after operating the electrical test drive for a first predetermined time to attempt to open the dosing valve with no reduction in liquid level, discontinuing operation of the electrical test drive for a second given time;
after the second given time, operating the electrical test drive for a second predetermined time to attempt to open the dosing valve of the dosing device;
upon no reduction in liquid level of liquid within the dosing tester in response to attempting to open of the dosing valve for the second predetermined time, discontinuing operation of the electrical test drive for a third given time;
after the third given time, operating the electrical test drive for a third predetermined time to attempt to open the dosing valve of the dosing device, upon determining that the dosing valve is not opening; and
closing the outlet valve of the dosing tester.

4. The method according to claim 3, wherein the first given time, the second given time, and the third given time are each at least about five minutes, and wherein the first predetermined time, the second predetermined time, and the third predetermined time are each at least about 110 seconds.

5. The method according to claim 3, including replacing the dosing device when the dosing valve does not open during the third predetermined time or earlier.

6. The method according to claim 1, wherein the dosing valve includes a dosing valve needle and the electrical test drive operates periodically to attempt to generate axial movement of the dosing valve needle.

7. The method according to claim 6, wherein the electrical test drive provides a pulse at a time period of about 20 milliseconds to repeatedly actuate and attempt to open the dosing valve.

8. The method according to claim 1, further including
disconnecting an electronic dosing device controller from the dosing device before connecting the electrical test drive; and
disconnecting a urea storage device from the dosing device before connecting the dosing tester to the liquid inlet of the dosing device.

9. The method according to claim 1, further including preparing the dosing tester by:
filling liquid into the storage tube of the dosing tester via the inlet of the dosing tester to about a liquid fill level mark;
closing the inlet valve of the dosing tester;
providing air into the storage tube via an air valve; and
discontinuing supply of air into the storage tube when a selected pressure is provided in the storage tube of the dosing tester.

10. The method according to claim 9, wherein the liquid is water.

11. The method according to claim 9, further including
disconnecting an electronic dosing device controller from the dosing device before connecting the electrical test drive; and
disconnecting a urea storage device from the dosing device before connecting the dosing tester to the liquid inlet of the dosing device.

12. A method for testing a dosing valve of a dosing device of a dosing system provided for reducing mono-nitrogen oxides NOx output by an exhaust pipe of a vehicle, the method comprising:
disconnecting an electronic dosing device controller from the dosing device;
disconnecting a urea storage device from the dosing device;
connecting an electrical test drive to an electrical connector of the dosing device;
connecting a dosing tester to a liquid inlet of the dosing device;
opening an outlet valve of the dosing tester to provide liquid to the liquid inlet of the dosing device;
after a first given time, operating the electrical test drive to attempt to open the dosing valve of the dosing device; and
when a reduction in liquid level of liquid within the dosing tester occurs in response to opening of the dosing valve of the dosing device, closing the outlet valve of the dosing tester and discontinuing operation of the electrical test drive.

13. The method according to claim 12,
when the electrical test drive operates for a first predetermined time, discontinuing operation of the electrical test drive for a second given time;
after the second given time, operating the electrical test drive for a second predetermined time to attempt to open the dosing valve of the dosing device; and
upon expiring of the second predetermined time without a decrease in liquid level of liquid within the dosing tester, discontinuing operation of the electrical test drive for a third given time; and
after the third given time, operating the electrical test drive for a third predetermined time, and upon expiring of the third predetermined time without a decrease in liquid level of liquid within the dosing tester, closing the outlet valve of the dosing tester and discontinuing operation of the electrical test drive.

14. The method according to claim 13, wherein upon expiring of the third predetermined time without a decrease in liquid level of liquid within the dosing tester, the method including
disconnecting the electrical test drive from the dosing device;
disconnecting the dosing tester from the liquid inlet of the dosing device;
removing the dosing device from the vehicle;
securing a second dosing device to the vehicle in communication with an exhaust pipe for providing liquid therein;
connecting an electronic dosing device controller to the second dosing device; and
connecting a urea storage device to the second dosing device.

15. The method according to claim 12, wherein operating the electrical test drive to attempt to open the dosing valve includes providing pulses to an actuator of the dosing valve of the dosing device for axially moving a dosing valve needle.

* * * * *